US010533519B2

(12) United States Patent
Gormley

(10) Patent No.: US 10,533,519 B2
(45) Date of Patent: Jan. 14, 2020

(54) TRANSLATING CASCADE HIDDEN BLOCKER DOOR THRUST REVERSER

(71) Applicant: Rohr, Inc., Chula Vista, CA (US)

(72) Inventor: Timothy Gormley, Bonita, CA (US)

(73) Assignee: Rohr, Inc., Chula Vista, CA (US)

(*) Notice: Subject to any disclaimer, the term of this patent is extended or adjusted under 35 U.S.C. 154(b) by 143 days.

(21) Appl. No.: 14/994,898

(22) Filed: Jan. 13, 2016

(65) Prior Publication Data

US 2017/0198659 A1  Jul. 13, 2017

(51) Int. Cl.
*F02K 1/70* (2006.01)
*F02K 1/72* (2006.01)
(Continued)

(52) U.S. Cl.
CPC .............. *F02K 1/70* (2013.01); *F02K 1/72* (2013.01); *F02K 1/763* (2013.01); *B64D 29/06* (2013.01);
(Continued)

(58) Field of Classification Search
CPC . F02K 1/763; F02K 1/766; F02K 1/12; F02K 1/1207; F02K 1/1215;
(Continued)

(56) References Cited

U.S. PATENT DOCUMENTS 3,036,431 A * 5/1962 Vdolek .................. F02K 1/625
239/265.31

3,262,269 A * 7/1966 Kutney ................. B64C 11/001
239/265.19

(Continued)

FOREIGN PATENT DOCUMENTS

DE  102013206595 A1  10/2014

OTHER PUBLICATIONS

Panda et al., "Aeroelasticity—In General and Flutter Phenomenon", 2009, Sewcond International Conference on Emerging Trends in Engineering and Technology, ICETET-09; ResearchGate, file:///C:/Users/scheng/Documents/WORK/Cool%20NPL/aeroelasticity%20and%20flutter.pdf, retrieved Oct. 1, 2018.*

(Continued)

*Primary Examiner* — Gerald L Sung
*Assistant Examiner* — Stephanie Cheng
(74) *Attorney, Agent, or Firm* — O'Shea Getz P.C.

(57) ABSTRACT

Aspects are directed to a system associated with a thrust reverser of an aircraft, comprising: a blocker door and a fan case, where when the thrust reverser is stowed the blocker door is stowed at least in part radially outboard of the fan case. Aspects include a thrust reverser system comprising: a fixed structure, a translating sleeve configured to translate relative to the fixed structure, at least one blocker door pivotally mounted to the translating sleeve, and a rod coupled to the fixed structure and to the at least one blocker door, where during a first phase of thrust reverser deployment the blocker door translates with the translating sleeve when the translating sleeve is translating toward its deployed position and does not rotate, and during a second phase following the first phase, the blocker door pivots relative to the translating sleeve from a stowed position to a deployed position.

11 Claims, 12 Drawing Sheets

(51) Int. Cl.
*F02K 1/76* (2006.01)
*B64D 29/06* (2006.01)
(52) U.S. Cl.
CPC ........ *F02K 1/766* (2013.01); *F05D 2220/323* (2013.01); *F05D 2260/50* (2013.01)
(58) Field of Classification Search
CPC ...... F02K 1/1223; F02K 1/123; F02K 1/1238; F02K 1/1246; F02K 1/1253; F02K 1/1261; F02K 1/1269; F02K 1/1276; F02K 1/1284; F02K 1/1292; F02K 1/60
See application file for complete search history.

(56) References Cited

U.S. PATENT DOCUMENTS

| | | | |
|---|---|---|---|
| 3,500,646 A | 3/1970 | Hom et al. | |
| 4,147,029 A * | 4/1979 | Sargisson | F02C 7/042 137/15.1 |
| 5,983,625 A * | 11/1999 | Gonidec | F02K 1/70 239/265.29 |
| 6,082,096 A * | 7/2000 | Vauchel | F02K 1/70 239/265.29 |
| 7,264,203 B2 * | 9/2007 | Lair | F02K 1/70 244/110 B |
| 7,874,142 B2 * | 1/2011 | Beardsley | F02K 1/72 239/265.29 |
| 8,109,468 B2 | 2/2012 | Andre et al. | |
| 8,904,751 B2 * | 12/2014 | Howarth | F02K 1/70 60/204 |
| 9,482,181 B2 * | 11/2016 | Hurlin | F02K 1/72 |
| 2012/0079805 A1 * | 4/2012 | Stuart | F02K 1/72 60/226.2 |
| 2013/0205753 A1 * | 8/2013 | Todorovic | F02K 3/025 60/226.2 |
| 2013/0284822 A1 * | 10/2013 | Howarth | F02K 1/70 239/11 |
| 2013/0292489 A1 * | 11/2013 | Vauchel | F02K 1/09 239/265.19 |
| 2014/0116026 A1 * | 5/2014 | Todorovic | F02K 1/72 60/226.2 |
| 2014/0270935 A1 * | 9/2014 | Willett | F02K 1/766 403/375 |
| 2014/0319243 A1 * | 10/2014 | Caruel | F02K 1/09 239/265.19 |
| 2016/0245229 A1 * | 8/2016 | Peyron | F02K 1/625 |
| 2016/0363097 A1 * | 12/2016 | Foutch | F02K 1/72 |

OTHER PUBLICATIONS

Schreiber et al., "Navier Stokes Computation on a Pivoting Doors Thrust Reverser and Comparison with Tests", 1992, ASME and International Gas Turbine and Aeroengine Congress and Exposition, Germany, Jun. 1-4, 1992, 92-GT-254.*
EP search report for EP17151250.2 dated Jun. 8, 2017.

* cited by examiner

TRANSLATING CASCADE HIDDEN BLOCKER DOOR THRUST REVERSER

BACKGROUND

Within a turbo fan engine that utilizes a cascade type thrust reverser, there are typically a plurality of blocker doors that deploy inside of a bypass air duct aft of a fan in order to redirect fan bypass air thru a set of cascades that turn the airflow out and forward in order to reverse the thrust direction. Reversing thrust may be done to slow an aircraft after landing.

Referring to FIGS. 1A-1B, a typical cascade type thrust reverser system 100 is shown. The system 100 includes a sleeve 102 that is translated or moved in, e.g., an aft direction in order to expose cascades 104 as part of the deployment of the thrust reverser (FIG. 1B). Similarly, in order to place the thrust reverser in a stowed state (e.g., during flight) the sleeve 102 is translated or moved in, e.g., a forward (FWD) direction, such that the sleeve 102 may close the passage of air through the cascades 104 (FIG. 1A). The length of the sleeve 102 stroke between the stowed and deployed positions is denoted as reference character 102a in FIG. 1B.

A blocker door 108 is typically pivotally attached to the sleeve 102 within the thrust reverser. For example, FIG. 1B illustrates the blocker door 108 of the system 100 hinged to the sleeve 102 near a point 110. Additionally, the door 108 is attached to the inner fixed structure (IFS) 114 of the thrust reverser via a drag link 112 and associated drag link fitting 116. During flight, the door 108 forms, in part, the outer surface of the bypass air duct 124. The drag link 112 crosses this bypass duct 124 in attaching to the WS 114 at the fitting 116. The positions of the blocker door 108 and the drag link 112 in FIG. 1B may be contrasted with their respective positions when the thrust reverser is stowed; the stowed positions are shown in FIG. 1B via reference characters/dashed lines 108' and 112', respectively. For purposes of further environmental context, in FIGS. 1A and 1B the IFS 114 is shown in relation to an engine exhaust nozzle 134 and a centerbody 142.

The drag link 112 lies within the airflow and generates drag losses on the engine, resulting in degraded efficiencies. Additionally, any steps and gaps around the blocker door 108 generate aerodynamic disturbances that reduce overall efficiency.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system associated with a thrust reverser of an aircraft, comprising: a blocker door, and, a fan case, where when the thrust reverser is stowed the blocker door is stowed at least in part radially outboard of the fan case. In some embodiments, the system further comprises a set of cascades configured to be stowed at least in part radially outboard of the fan case when the thrust reverser is stowed. In some embodiments, the system further comprises a sleeve configured to translate in a substantially forward or aft reference direction based on a state of a deployment of the thrust reverser. In some embodiments, the system further comprises a pushrod coupled to the blocker door at a first end of the pushrod. In some embodiments, the system further comprises a delay mechanism coupled to a second end of the pushrod, the delay mechanism configured to implement a delay between a translation of the sleeve and a deployment of the blocker door into a bypass duct. In some embodiments, the delay mechanism comprises a track coupled to a fixed structure, a carrier coupled to the second end of the pushrod, the carrier configured to traverse the track, and a latch coupled to the carrier, the latch including a first catch configured to selectively be seated in a first detent formed in the sleeve and a second catch configured to selectively be seated in a second detent formed in the fixed structure. In some embodiments, the first catch is configured to be seated in the first detent when the thrust reverser is stowed, and the second catch is configured to be seated in the second detent when the thrust reverser is fully deployed. In some embodiments, the system further comprises a roller coupled to the sleeve, the roller configured to translate in the substantially forward or aft reference direction coinciding with the translation of the sleeve. In some embodiments, in a first state in the deployment of the thrust reverser the latch, the carrier, and the pushrod are configured to translate with the sleeve, and in a second state in the deployment of the thrust reverser the sleeve is configured to translate independently of the latch, the carrier, and the pushrod. In some embodiments, the system further comprises a cartridge coupled to the sleeve and the blocker door.

Aspects of the disclosure are directed to a thrust reverser system for an aircraft propulsion system comprising: a fixed structure, a translating sleeve configured to translate relative to the fixed structure, at least one blocker door pivotally mounted to the translating sleeve, and a rod coupled on a first end thereof to the fixed structure and on a second end opposite the first end to the at least one blocker door, where during a first phase of thrust reverser deployment the blocker door translates with the translating sleeve when the translating sleeve is translating toward its deployed position and does not rotate, and during a second phase of thrust reverser deployment following the first phase, the blocker door pivots relative to the translating sleeve from a stowed position to a deployed position. In some embodiments, the thrust reverser system further comprises a lost motion device interposed between the fixed structure and the blocker door. In some embodiments, the lost motion device is coupled to the second end of the rod and to the blocker door. In some embodiments, the lost motion device is coupled to the first end of the rod and to the fixed structure. In some embodiments, the lost motion device is configured to permit the first end of the rod to slide relative to the fixed structure in the first phase of thrust reverser deployment. In some embodiments, the lost motion device is configured to permit the translating sleeve to translate independently of the rod in the second phase of thrust reverser deployment. In some embodiments, the first end of the rod is forward of the second end of the rod. In some embodiments, the thrust reverser system further comprises a cartridge pivotally coupled to the blocker door and pivotally coupled to the translating sleeve, where the cartridge is configured to ensure that loads on the blocker door do not reverse or change orientation during blocker door deployment by applying a compression or tension force, and where the cartridge is configured to provide a preload on the blocker door when the blocker door is stowed. In some embodiments, the thrust reverser system further comprises a set of cascades fixed to the translating sleeve.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
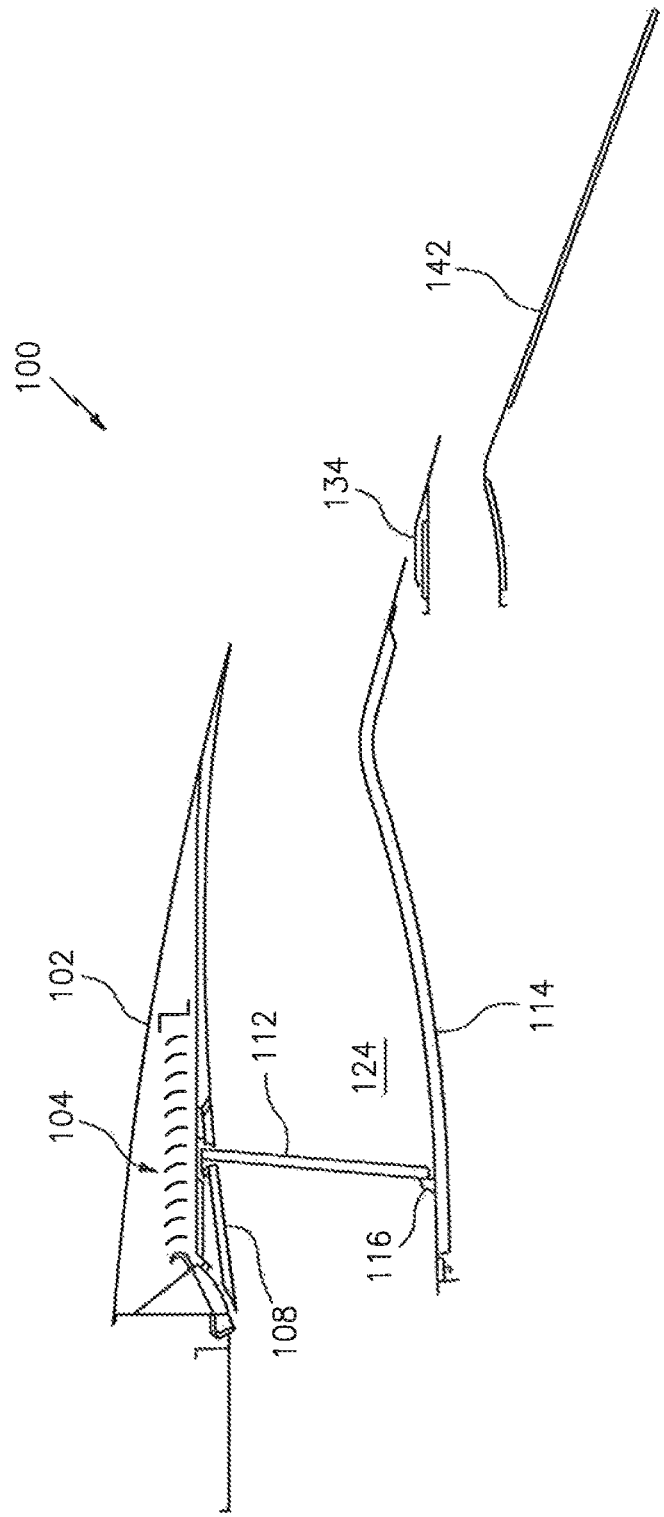
FIG. 1A schematically illustrates a thrust reverser system incorporating a translating sleeve in accordance with the prior art when the thrust reverser is stowed.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described in connection with an arrangement of a thrust reverser. In some embodiments, arrays of cascades and blocker doors may be at least partially stowed above, or radially outboard of, a fan case. A delay mechanism may be incorporated in connection with a blocker door to delay the rotation/deployment of the blocker door until it is clear of fixed structure.

Figure 2A:
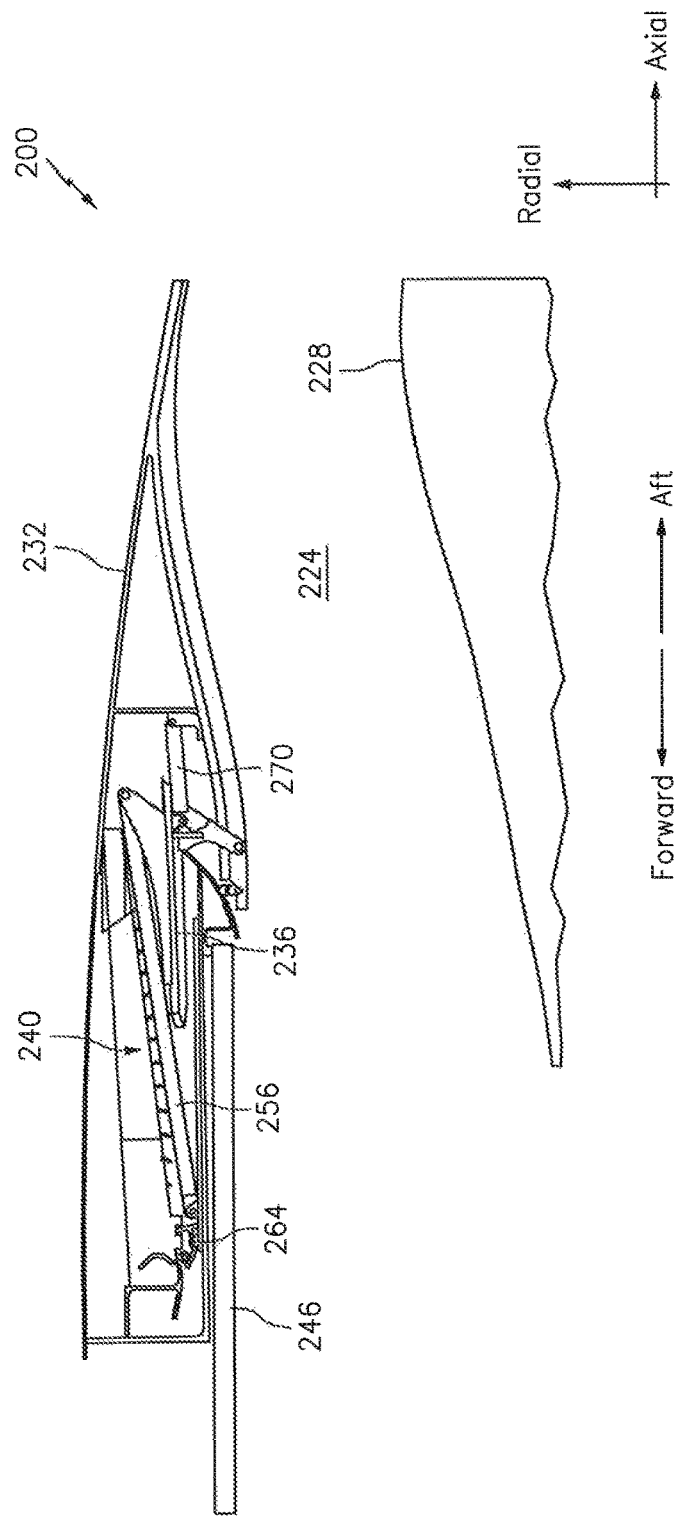
FIG. 2A-2E illustrate a system incorporating a thrust reverser in accordance with aspects of this disclosure.
Figure 2B:
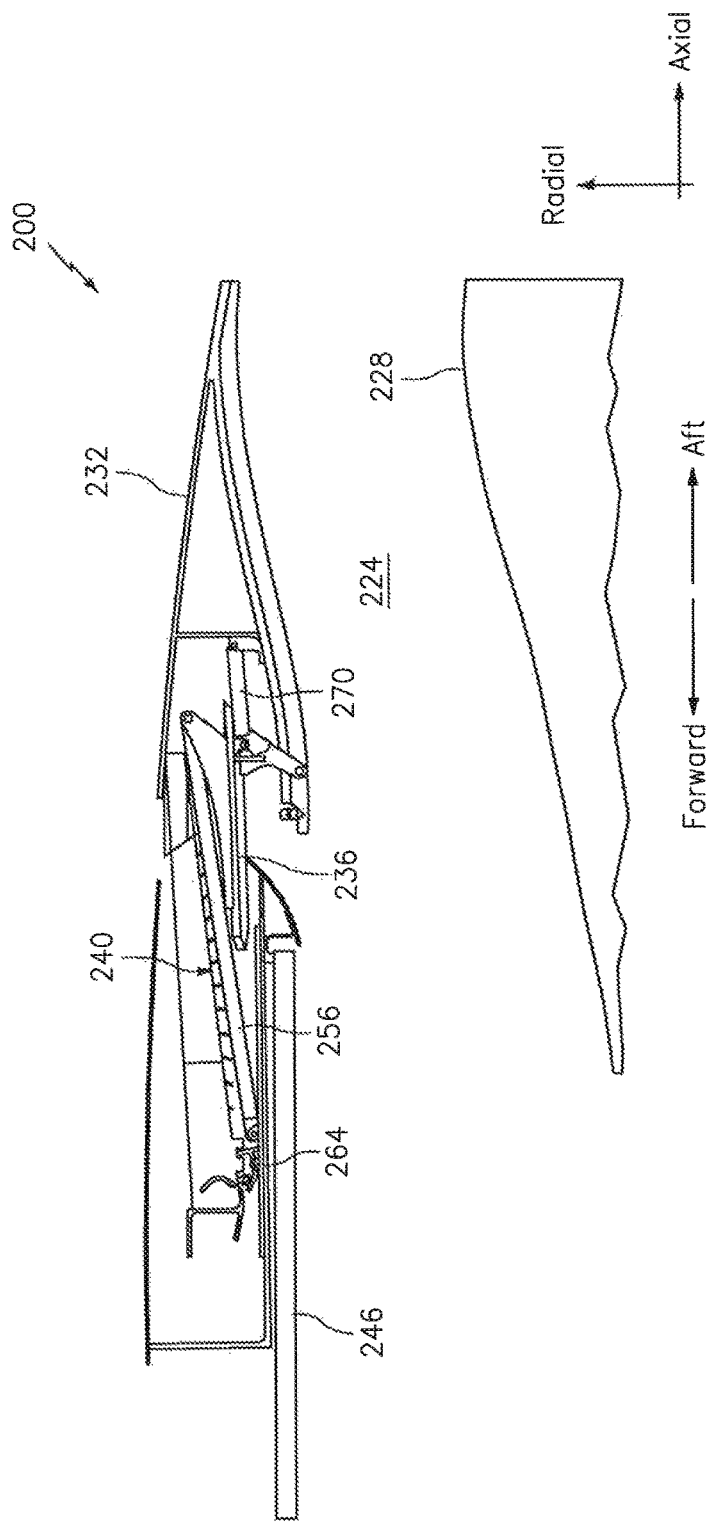
Figure 2C:
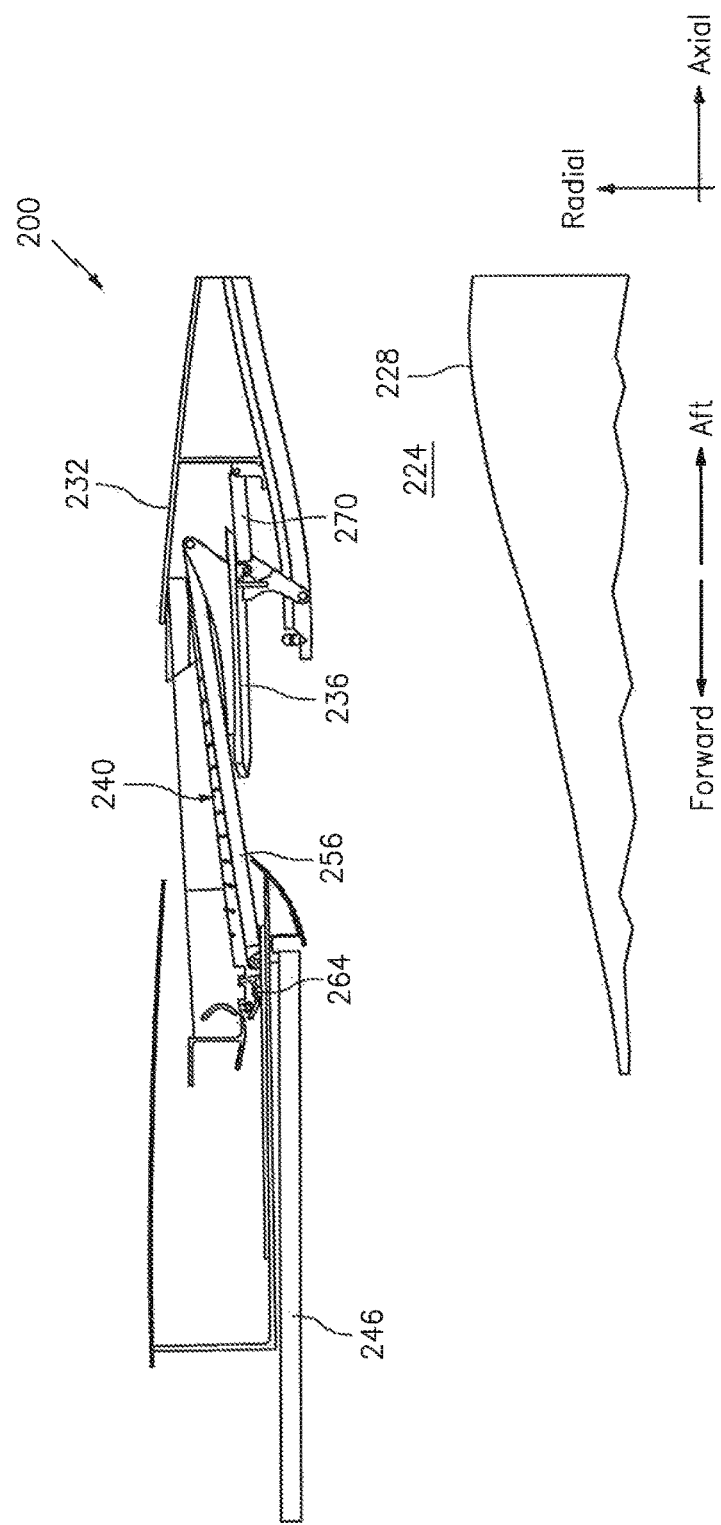
Figure 2D:
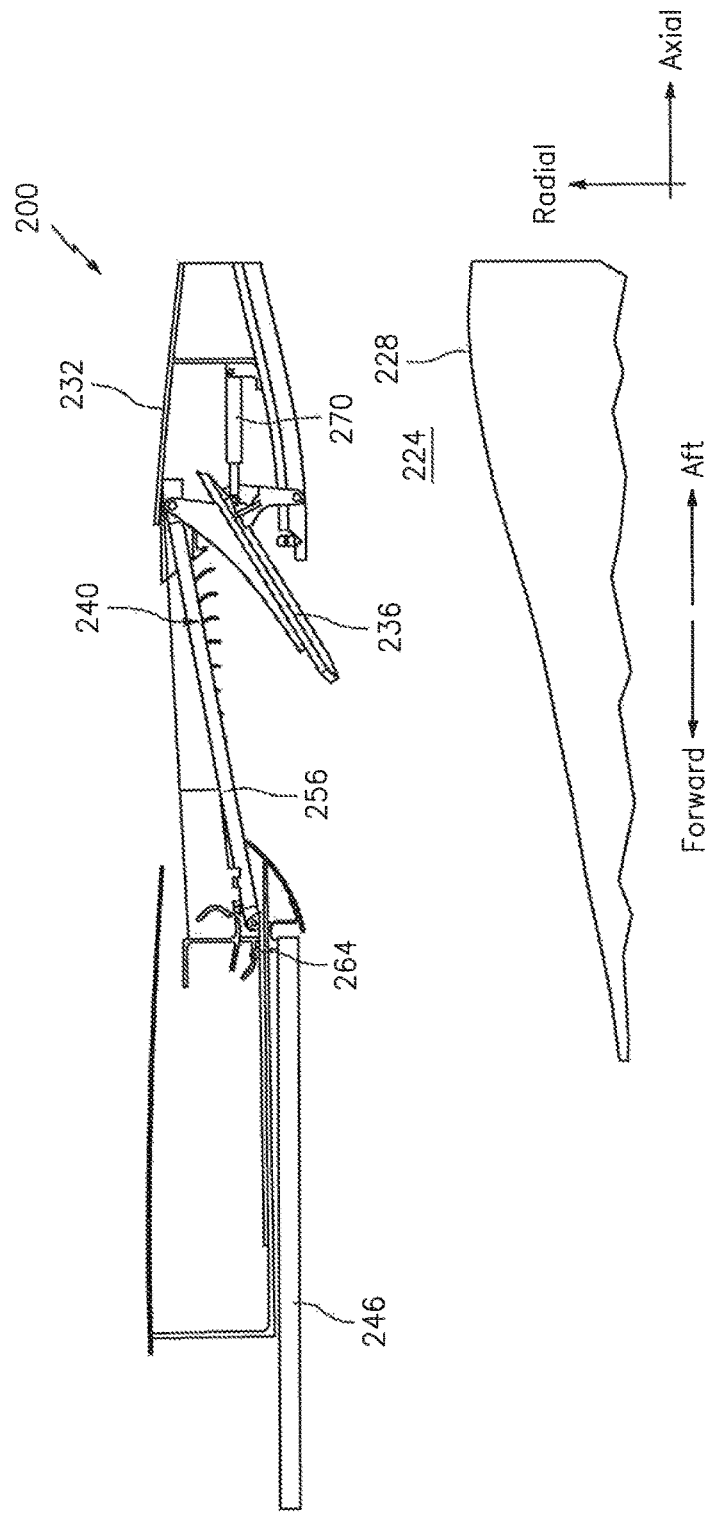
Figure 2E:
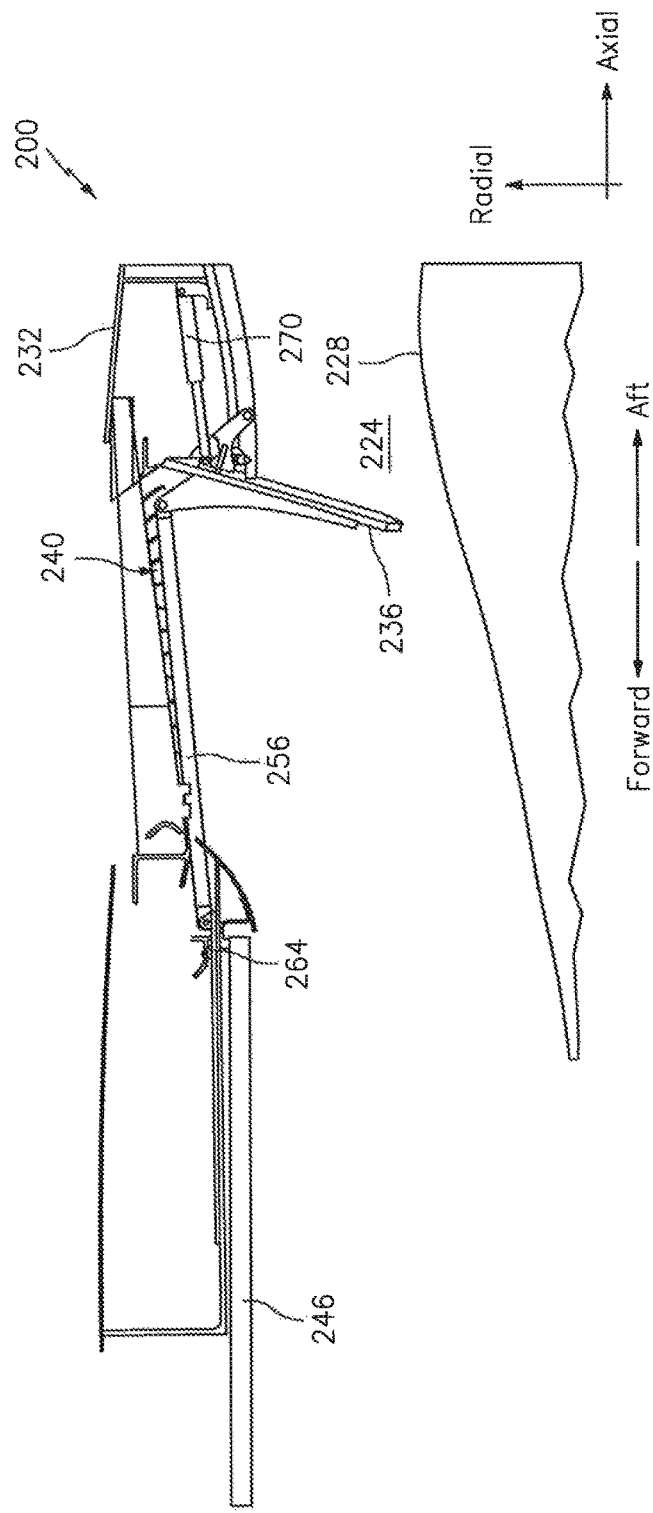

Referring now to FIGS. 2A-2E, components of a system 200 associated with a thrust reverser are illustrated. Taking FIGS. 2A-2E in order/sequence, the figures reflect a progression of the deployment of the thrust reverser from a stowed state to a fully deployed state, FIG. 2A represents the thrust reverser in a stowed state, while FIG. 2E represents the thrust reverser in a fully deployed state.

Figure 1B:
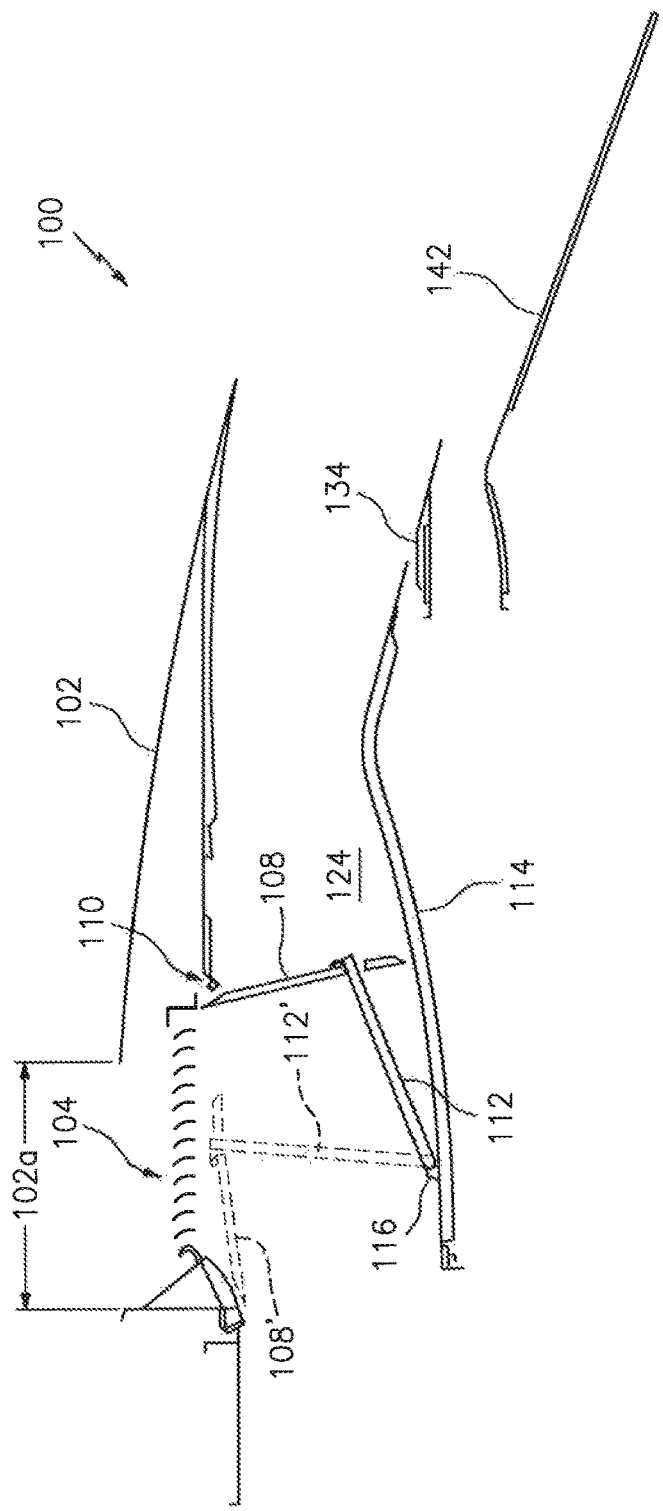
FIG. 1B schematically illustrates the thrust reverser system of FIG. 1A when the thrust reverser is deployed.

Referring to FIG. 2A an arrangement of a bypass duct 224 that is at least partially located/defined between an IFS 228 and a translating sleeve 232 is illustrated. In contrast to the typical prior art arrangement described above in connection with FIGS. 1A-1B (wherein the blocker door 108 forms at least part of the surface of the bypass duct 124), when the thrust reverser is stowed as shown in FIG. 2A a blocker door 236 is hidden/concealed from the bypass duct 224 and forms no part of its boundary surfaces. One way to achieve this is by storing the blocker doors 236 "inside" of the sleeve 232 when the thrust reverser is stowed. Similarly, a set/array of cascades 240 is not exposed to the bypass duct 224 when the thrust reverser is stowed. In the scenario depicted in FIG. 2A, the blocker door 236 and the cascades 240 may be stowed at least partly over/radially outboard of a fan case 246 (the fan case is the structure radially surrounding the fan for containment purposes and joined to the engine case) for packaging reasons. During deployment, the kinematic structure of the thrust reverser will deploy the blocker doors 236 by translating them in a forward to aft direction away from their storage location at least partly outside of the fan case 246, and by rotating them into position to block the fan duct 224. The cascades/cascade segments 240 will also be deployed by translating in a forward to aft direction to their deployed position. The kinematic structure moves the sleeve 232 in a generally forward to aft direction away from the blocker doors 236 before beginning rotation of the blocker doors 236 to their deployed positions, to avoid a clash.

It should be understood that FIGS. 2A-2E schematically illustrate a sectional view of a thrust reverser half, showing in an illustrative manner a single blocker door 236 and cascade segment 240. Of course, a full set of blocker doors 236 and cascade segments 240 (not shown) are disposed circumferentially around the thrust reverser. As is known, the thrust reverser may be constructed in two halves (or more segments) that attach together during use of the propulsion system, in which case each thrust reverser half includes a share of the almost circumferential array of radially disposed blocker doors 236 and cascade segments 240.

The blocker door 236 may be of conventional construction and is supported pivotally around one point by a connection to the sleeve 232, and is supported pivotally around another point by the aft end of a pushrod 256. The blocker door 236 may also be pivotally attached to an optional, adjustable length cartridge 270. The sleeve 232 may also be of conventional construction and may be supported on the fixed structure of the thrust reverser for translating movement relative thereto. In a conventional manner, the sleeve 232 may be mounted via sliders and grooves to a pair of beams (not pictured) of the fixed structure of the thrust reverser, or may be mounted in another fashion as will be apparent to those of ordinary skill in this art. A thrust reverser actuation system (not pictured) is used to translate the sleeve 232 from a stowed position to a deployed position, and back again to the stowed position. The thrust reverser actuation system may constitute conventional hydraulic or pneumatic linear actuators disposed between the sleeve 232 and the fixed structure of the thrust reverser. Alternatively, the thrust reverser actuation system could be any suitable system, and need not be illustrated or further described herein. Together, the sleeve 232, the blocker door 236, the pushrod 256, and the fixed structure of the thrust reverser constitute a four-bar kinematic mechanism, with translating motion also sometimes possible between two of the links, in the illustrated case between the pushrod and the fixed structure. The cartridge 270 joins two of the links, but is extensible and does not during normal operation restrict movement of the links, but rather applies a compressive or tension force between them.

FIG. 2A shows the pushrod 256, a delay mechanism 264, and the cartridge 270. Pushrod 256 is any generally rigid, non-extensible and non-retractable fixed length structure. A first, aft end of the pushrod 256 may be pivotally coupled to the blocker door 236. The delay mechanism 264 may be pivotally coupled to a second, forward end of the pushrod 256. The delay mechanism 264 may be used to implement lost motion between the translation of the sleeve 232 and the forward end of the pushrod 256, and ultimately the deployment of the blocker door 236 into the bypass duct 224. The delay mechanism 264 fixes the forward end of the pushrod 256 to the sleeve 232 during a first stage of deployment, such that the forward end of the pushrod and the sleeve 232 move together. During a second stage of deployment, the delay mechanism 264 fixes the forward end of the pushrod 256 to the fixed structure of the thrust reverser so that the forward end of the pushrod does not move aft any further, while the translating sleeve continues its aft deployment.

The optional cartridge 270 may be pivotally coupled to the blocker door 236 and pivotally coupled to the sleeve 232. The cartridge 270 may be used to ensure that certain loads on the blocker door 236 do not reverse/change direction/orientation during blocker door deployment by applying a biasing compression or tension force. In some embodiments, the cartridge 270 may include a mechanical spring or a gas spring, or any other suitable structure for applying a biasing force, as will be apparent to those of ordinary skill in this art. As reflected in the progression of deployment from FIG. 2A to FIG. 2E described further below, the cartridge 270 may extend to facilitate the deployment/rotation of the blocker door 236. The cartridge 270 may also provide a preload on the stowed blocker door 236 to reduce vibrations.

FIG. 2B illustrates the system 200 during the initial stages of thrust reverser deployment as the thrust reverser actuation system translates the sleeve 232 in an aft direction relative to the fixed structure of the thrust reverser. In this stage of deployment, the delay mechanism 264 and the forward end of the pushrod 256 are locked to the sleeve 232, and are translating aft at the same rate as the sleeve 232. At this stage, the blocker door 236 has not deployed into the fan air duct, i.e. has not rotated relative to the sleeve 232.

At the point/stage of the thrust reverser deployment shown in FIG. 2C, the delay mechanism 264 may unlock from the sleeve 232 and may lock to fixed structure of the thrust reverser. As a result, the forward end of pushrod 256 is then rotationally coupled/locked to the fixed structure and will no longer translate aft as the sleeve continues its aft translation.

In FIG. 2D, the sleeve 232 may be translated aft to such an extent that the door 236 may begin to rotate (e.g., counter clockwise in the example shown) into the bypass duct 224. The rotation of the blocker door 236 is a result of the door's pivotal connection to the sleeve 232, and its pivotal connection to the aft end of the pushrod 256. Because the forward end of the pushrod 256 is now fixed to the thrust reverser fixed structure, and the pivotal connection of the blocker door 236 to the sleeve 232 translates aft, this relative motion produces a couple that rotates the pushrod 256 clockwise and the blocker door 236 counterclockwise (in the perspective of FIG. 2D) to its deployed position. In its deployed position, the blocker door 236 may redirect at least a portion of the bypass air flow in the bypass duct 224 through the cascades 240 in order to generate reverse thrust.

FIG. 2E shows the completed deployment of the thrust reverser. Stowing the thrust reverser and the blocker doors 236 occurs in the same manner as the deployment, but in reverse order.

As shown in the progression from, e.g., FIG. 2B to FIG. 2D, the cascades 240 are shown as translating/moving with the sleeve 232 (illustratively in a forward-to-aft reference direction). The cascades 240 may be fixed to the sleeve 232 to provide for such motion.

Figure 3A:
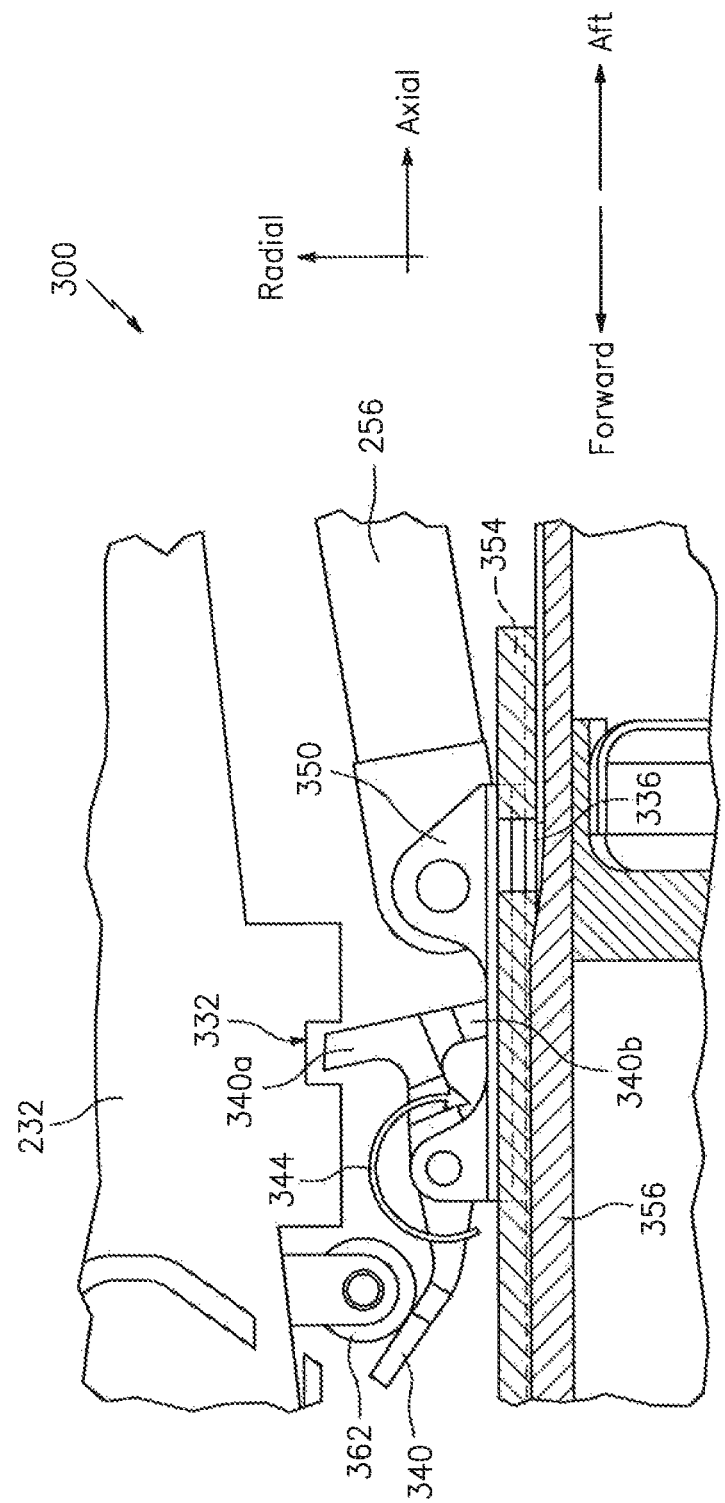
FIG. 3A-3E illustrates a system that includes aspects of a delay mechanism in accordance with aspects of this disclosure.

Referring to FIG. 3A, a system 300 is shown. It should be apparent to those or ordinary skill in this art that the system 300 is just one example of a mechanism that could constitute the delay mechanism 264. Many other designs would work and may be selected to suit a particular application. The system 300 is shown as including some of the components/devices described above in connection with the system 200 of FIGS. 2A-2E, and therefore, a complete re-description is omitted for the sake of brevity.

The system 300 is shown as including a first detent 332 formed in the sleeve 232 and a second detent 336 formed in a portion 356 of the thrust reverser fixed structure. The detents 332 and 336 may be configured to selectively seat/receive/lock one or more catches (e.g., catches 340a and 340b) associated with a trigger/latch 340 as a function of the state of the thrust reverser (e.g., stowed, partially deployed, fully deployed). In FIG. 3A, a reference arrow 344 indicates a direction in which the latch 340 may be biased. Such biasing may be accomplished through use of a torsion spring or any other applicable device, as will be apparent to those of ordinary skill in this art.

The latch 340 may be coupled to a structure such as a carrier 350. The carrier 350 may be pivotally coupled to the forward end of pushrod 256. The carrier 350 may be configured to traverse a track 354 coupled (e.g., attached) to the thrust reverser fixed structure. For example, the carrier 350 may be configured to traverse or translate within the track 354 in a substantially forward or aft reference direction.

The sleeve 232 may be coupled to, or include, a roller 362. The roller 362 may selectively engage the latch 340 when the sleeve 232 is moving in the forward direction during stowing. For example, the roller 362 may engage the latch 340 to counteract the torsional bias of the latch 340 and pivot it around its pivotal attachment point to the carrier 350.

In FIG. 3A, the catch 340a of the latch 340 is shown as being at least partially seated/received within the sleeve detent 332 (and not in the fixed structure detent 336).

As part of the deployment of the thrust reverser (coinciding with a transition from FIG. 3A to FIG. 3B), and because the catch 340a is engaged/received in the detent 332, the latch 340, the carrier 350, and the forward end of pushrod 256 may translate forward to aft along with the with the forward to aft translation of the sleeve 232. In this state, the forward end of pushrod 256 slides relative to the fixed structure 356.

Figure 3B:
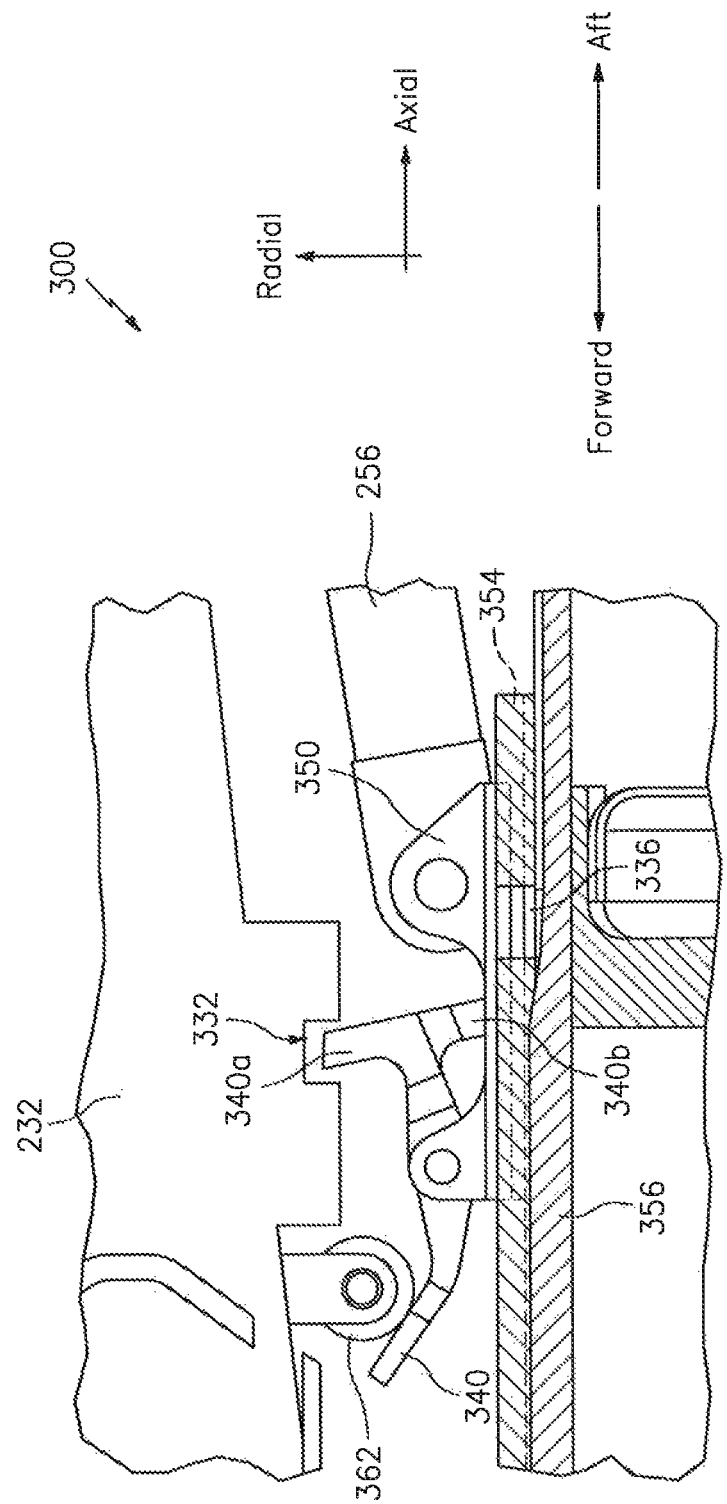
Figure 3C:
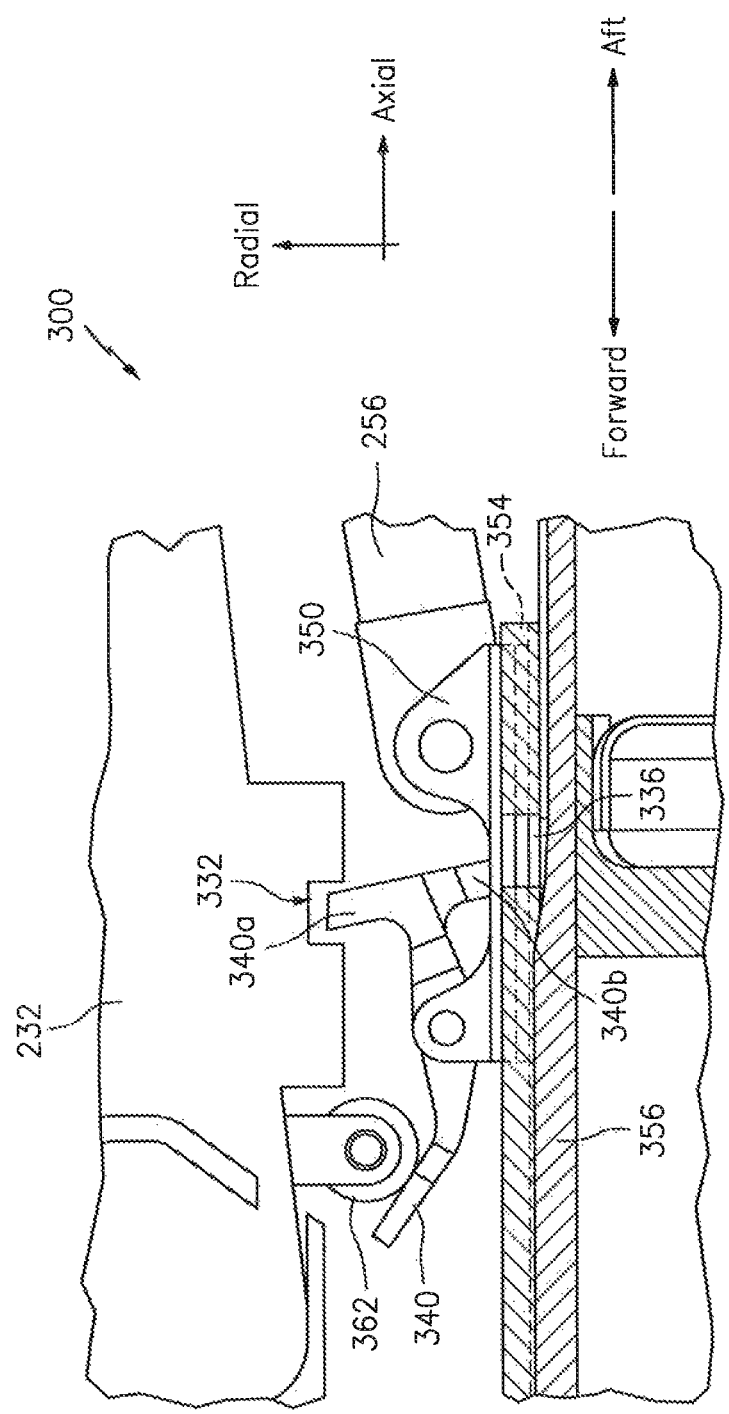

In FIG. 3C, as the catch 340b of latch 340 approaches the fixed structure detent 336, the latch 340 may begin to rotate (clockwise in FIG. 3C). This rotation of the latch 340 may start to decouple/unseat/unlock the catch 340a of latch 340 from the sleeve detent 332 (and hence, the sleeve 232) and couple/seat/lock the catch 340b of latch 340 to the fixed structure detent 336.

Figure 3D:
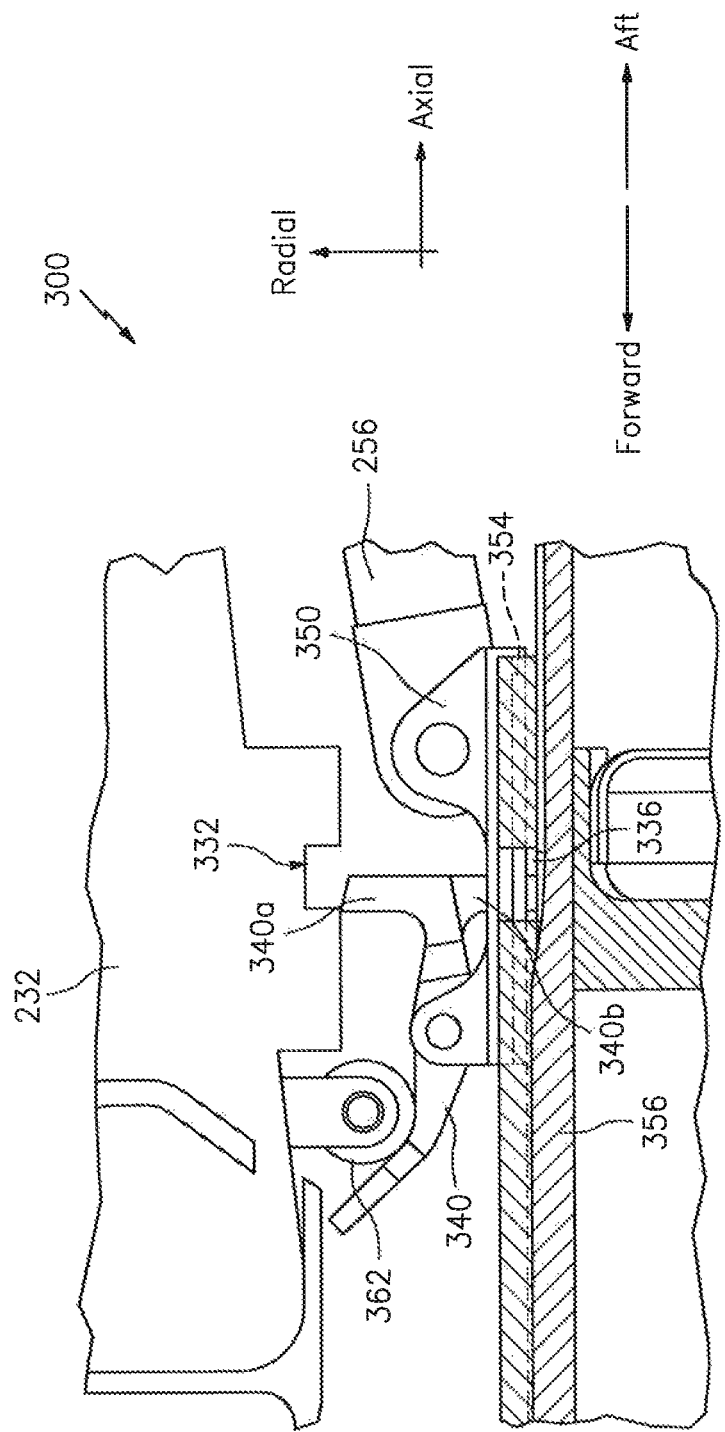
Figure 3E:
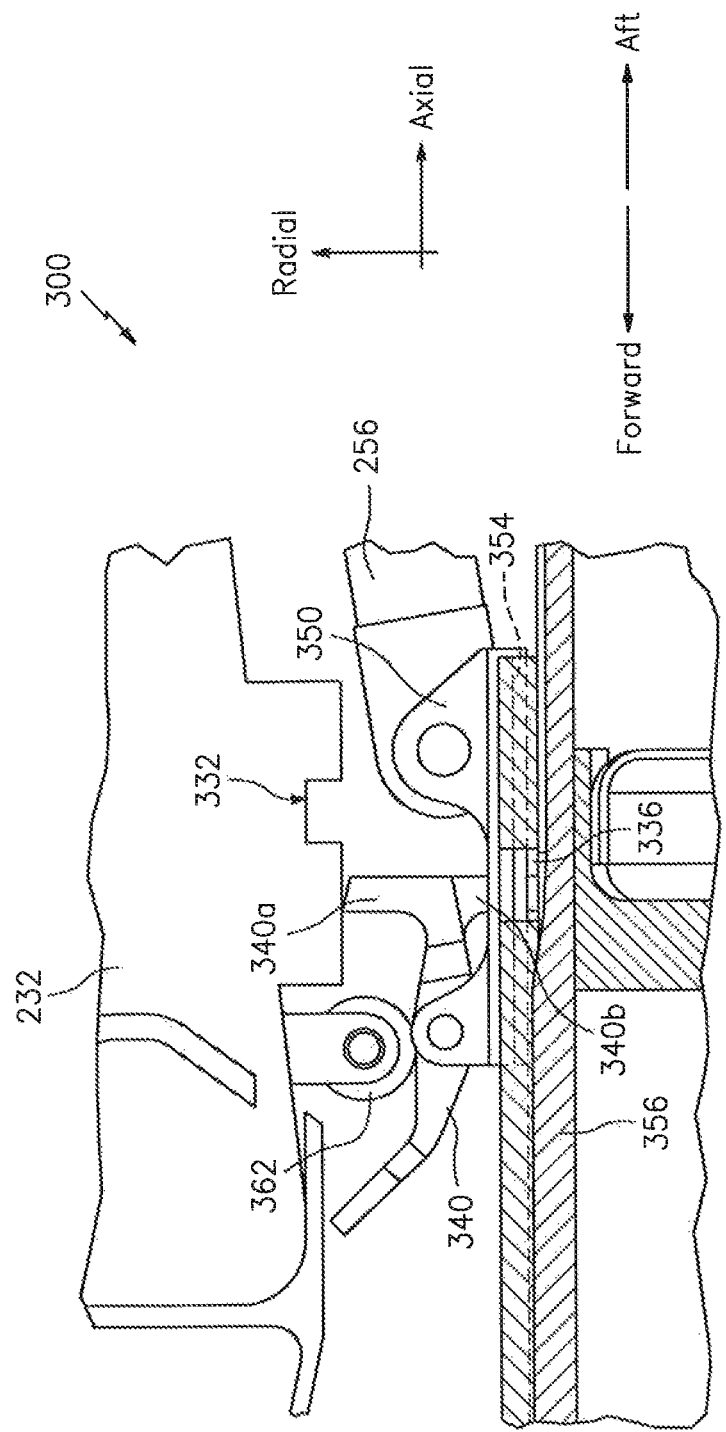

As shown in FIG. 3D, the catch 340b of latch 340 may be seated within/engaged to the fixed structure detent 336. As previously mentioned, the latch 340 may be biased to rotate into the position shown in FIG. 3D. As the sleeve 232 continues to translate in the forward to aft direction (see, e.g., FIG. 3E), the sleeve 232 will do so independent of the latch 340, the carrier 350, and the pushrod 256, which are, rather, coupled to and prevented from moving by the fixed structure 356 of the thrust reverser. In this state, there is relative translating motion between the forward end of pushrod 256 and the translating sleeve 232, the translating sleeve 232 translates while the forward end of the pushrod 256 is fixed through a pivotal connection to the thrust reverser fixed structure.

The progression of the system 300 in transitioning from FIGS. 3A-3E, in sequence, may represent the various states/stages of deployment of the thrust reverser and may correspond to the same sequence described above in relation to FIGS. 2A-2E (e.g., FIG. 3A may correspond to FIG. 2A, FIG. 3B may correspond to FIG. 2B, etc.). The stowing of the thrust reverser may be accomplished in a similar manner, but in reverse order. Also, during stowing, when the catch 340b is to be disengaged from the detent 336, the latch 340 must rotate in an opposite direction (counter-clockwise in the figures). This rotation of the latch 340 against its biasing force is accomplished by the roller 362 attached to the sleeve 332, which applies a force to the latch 340 to rotate it in a counter-clockwise direction (in the perspective of the figures).

As an alternate embodiment, those of ordinary skill in this art will recognize how the lost motion device may be positioned between the pushrod 256 and the blocker door 236, rather than between the pushrod 256 and the fixed structure 356, and operate in a similar manner.

Technical effects and benefits of the disclosure include elimination of in-stream drag links and associated fittings, thereby increasing/maximizing engine performance. A bypass duct length may be shortened relative to traditional/conventional systems, thereby resulting in less drag. Steps and gaps that might have otherwise existed around the blocker doors may be eliminated, again resulting in less drag. Greater flexibility may be obtained in terms of loft design. Opportunities for acoustic treatment are provided.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

I claim:

1. A system associated with a thrust reverser of an aircraft, comprising:
   a blocker door;
   a fan case;
   wherein, when the thrust reverser is stowed, the blocker door is stowed at least in part radially outboard of the fan case;
   a sleeve configured to translate in a substantially forward or aft reference direction based on a state of a deployment of the thrust reverser;
   an adjustable length cartridge coupled to the sleeve and the blocker door such that the adjustable length cartridge connects the blocker door to the sleeve, a forward portion of the adjustable length cartridge radially inward of the blocker door when the thrust reverser is stowed
   a pushrod coupled to the blocker door at a first end of the pushrod; and
   a delay mechanism coupled to a second end of the pushrod, the delay mechanism configured to implement a delay between a translation of the sleeve and a deployment of the blocker door into a bypass duct;
   the delay mechanism comprising a track, a carrier, and a latch;
   the track coupled to a fixed structure;
   the carrier coupled to the second end of the pushrod, and the carrier configured to traverse the track; and
   a latch coupled to the carrier, and the latch including a first catch configured to selectively be seated in a first detent formed in the sleeve and a second catch configured to selectively be seated in a second detent formed in the fixed structure;
   wherein, the state of the deployment of the thrust reverser transitions between a first state in the deployment and a second state in the deployment,
   wherein in the first state in the deployment of the thrust reverser, the latch, the carrier and the pushrod are configured to translate with the sleeve; and
   wherein, in the second state in the deployment of the thrust reverser, the sleeve is configured to translate independently of the latch, the carrier, and the pushrod.

2. The system of claim 1, further comprising:
   a set of cascades configured to be stowed at least in part radially outboard of the fan case when the thrust reverser is stowed.

3. The system of claim 1, wherein
   the first catch is configured to be seated in the first detent when the thrust reverser is stowed; and,
   the second catch is configured to be seated in the second detent when the thrust reverser is fully deployed.

4. The system of claim 1, further comprising:
   a roller coupled to the sleeve,
   the roller configured to translate in the substantially forward or aft reference direction coinciding with the translation of the sleeve.

5. The system of claim 1, wherein the fan case is configured to radially surround a fan for containment purposes of the fan.

6. The system of claim 1, wherein the adjustable length cartridge is configured to extend in length when the blocker door pivots to a deployed position of the blocker door.

7. A system for an aircraft propulsion system comprising:
   a fixed structure;
   a translating sleeve configured to translate relative to the fixed structure;
   at least one blocker door pivotally mounted to the translating sleeve;
   a rod including a first end and a second end opposite the first end, the rod coupled to the fixed structure by a pivot connection at the first end, and the rod coupled to the at least one blocker door at the second end;
   wherein, during a first phase of thrust reverser deployment, the at least one blocker door translates with the translating sleeve when the translating sleeve is translating toward its deployed position and does not rotate; and
   wherein, during a second phase of thrust reverser deployment following the first phase, the at least one blocker door pivots relative to the translating sleeve from a stowed position to a deployed position as the translating sleeve is translated further towards its deployed position; and
   wherein the rod is radially outboard of a bypass duct of the aircraft propulsion system when the at least one blocker door is in its deployed position; and
   wherein the first end is located within a cavity of the fixed structure; and
   a lost motion device interposed between the fixed structure and the at least one blocker door, the lost motion device coupled to the first end of the rod and to the fixed structure, the lost motion device configured to permit the first end of the rod to slide relative to the fixed structure in the first phase of thrust reverser deployment, and the lost motion device configured to permit the translating sleeve to translate independently of the rod in the second phase of thrust reverser deployment.

8. The system of claim 7, wherein the first end of the rod is forward of the second end of the rod.

9. The system of claim 7, further comprising:
   a cartridge pivotally coupled to the at least one blocker door and pivotally coupled to the translating sleeve;

wherein the cartridge is configured to ensure that loads on the at least one blocker door do not reverse or change orientation during blocker door deployment by applying a compression or tension force; and wherein the cartridge is configured to provide a preload on the at least one blocker door when the at least one blocker door is stowed.

10. The system of claim 7, further comprising:

a set of cascades fixed to the translating sleeve.

11. The system of claim 7, further comprising a fan containment structure configured for containment of a fan;

the at least one blocker door at least partially axially overflapping the fan containment structure when the at least one blocker door is stowed.

* * * * *